United States Patent
Shin et al.

(10) Patent No.: US 10,707,465 B2
(45) Date of Patent: Jul. 7, 2020

(54) FILM MANUFACTURING METHOD, FILM MANUFACTURING APPARATUS, AND FILM

(71) Applicant: Sumitomo Chemical Company, Limited, Tokyo (JP)

(72) Inventors: Akihiko Shin, Niihama (JP); Atsuhiro Takata, Niihama (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 121 days.

(21) Appl. No.: 15/770,793

(22) PCT Filed: Oct. 31, 2016

(86) PCT No.: PCT/JP2016/082349
§ 371 (c)(1),
(2) Date: Apr. 25, 2018

(87) PCT Pub. No.: WO2017/073788
PCT Pub. Date: May 4, 2017

(65) Prior Publication Data
US 2018/0309104 A1    Oct. 25, 2018

(30) Foreign Application Priority Data

Oct. 30, 2015    (JP) .................................. 2015-214893

(51) Int. Cl.
*H01M 2/14*    (2006.01)
*B05D 3/02*    (2006.01)
(Continued)

(52) U.S. Cl.
CPC .............. *H01M 2/145* (2013.01); *B05D 3/02* (2013.01); *B05D 7/04* (2013.01); *B32B 27/32* (2013.01);
(Continued)

(58) Field of Classification Search
None
See application file for complete search history.

(56) References Cited

U.S. PATENT DOCUMENTS 5,830,603 A * 11/1998 Oka ...................... H01M 2/145
429/249
5,851,610 A * 12/1998 Ristey .................. B29C 55/143
428/34.9

(Continued)

FOREIGN PATENT DOCUMENTS

| JP | H0452424 A | 9/1992 |
| JP | H1010676 A | 1/1998 |

(Continued)

OTHER PUBLICATIONS

JP-2011031457-A English machine translation (Year: 2011).*

(Continued)

*Primary Examiner* — Scott J. Chmielecki
(74) *Attorney, Agent, or Firm* — Panitch Schwarze Belisario & Nadel LLP

(57) ABSTRACT

A method of producing a film is provided. The film includes a base material layer which is shrunk by heat and a functional layer which is dried while being restricted by the base material layer. The method involves heating the film while applying a tensile force in a direction of a length of the film so as to convey the film, and subjecting the film to a heat treatment while, in a distribution along a width of the film, a center part is higher in temperature than end parts. A center part sample of the film is smaller in curling amount with respect to the width of the film than an end part sample, or a standard deviation in curling amount with respect to the width is not more than 1 mm between two samples from respective end parts and a sample from the center part of the film.

7 Claims, 7 Drawing Sheets

(51) Int. Cl.
B32B 27/32 (2006.01)
B32B 27/34 (2006.01)
H01M 2/16 (2006.01)
C08J 5/18 (2006.01)
C08J 7/04 (2020.01)
B05D 7/04 (2006.01)
B32B 38/00 (2006.01)

(52) U.S. Cl.
CPC ............... *B32B 27/34* (2013.01); *C08J 5/18* (2013.01); *C08J 7/0427* (2020.01); *H01M 2/1653* (2013.01); *H01M 2/1686* (2013.01); B32B 38/004 (2013.01); B32B 2457/10 (2013.01); C08J 2323/06 (2013.01); C08J 2477/10 (2013.01)

(56) References Cited

U.S. PATENT DOCUMENTS

| | | | | |
|---|---|---|---|---|
| 6,090,898 | A * | 7/2000 | Tsunekawa | C08J 5/18 525/444 |
| 6,565,985 | B2 * | 5/2003 | Ueyama | B29C 55/28 428/347 |
| 8,309,202 | B2 * | 11/2012 | Kojima | B29C 55/026 428/141 |
| 8,354,185 | B2 * | 1/2013 | Jung | B29C 55/14 264/45.1 |
| 2006/0121299 | A1 * | 6/2006 | Hashimoto | C08J 5/04 428/480 |
| 2009/0035596 | A1 | 2/2009 | Higashi | |
| 2010/0068612 | A1 * | 3/2010 | Nishikawa | H01M 2/1646 429/129 |
| 2010/0316912 | A1 * | 12/2010 | Hashimoto | H01G 9/02 429/254 |
| 2011/0003178 | A1 * | 1/2011 | Ishihara | H01M 2/1653 429/7 |
| 2014/0159271 | A1 * | 6/2014 | Itou | B29C 48/08 264/48 |
| 2014/0377630 | A1 | 12/2014 | Kawakami et al. | |
| 2015/0194652 | A1 | 7/2015 | Okihiro et al. | |
| 2016/0268570 | A1 | 9/2016 | Wang et al. | |
| 2016/0268571 | A1 | 9/2016 | Honda | |
| 2018/0013118 | A1 | 1/2018 | Kawakami et al. | |
| 2018/0229398 | A1 * | 8/2018 | Sakimoto | B32B 27/34 |

FOREIGN PATENT DOCUMENTS

| | | |
|---|---|---|
| JP | 2001113215 A | 4/2001 |
| JP | 200647820 A | 2/2006 |
| JP | 2007197611 A | 8/2007 |
| JP | 201131457 A | 2/2011 |
| JP | 2011031457 A * | 2/2011 |
| JP | 201526609 A | 2/2015 |
| JP | 2015130270 A | 7/2015 |
| WO | 2015064726 A1 | 5/2015 |
| WO | 2015099190 A1 | 7/2015 |

OTHER PUBLICATIONS

Int'l Preliminary Examination Report on Patentability dated May 1, 2018 in Int'l Appln No. PCT/JP2016/082349.

Int'l Search Report dated Jan. 24, 2017 in Int'l Application No. PCT/JP2016/082349.

* cited by examiner

FILM MANUFACTURING METHOD, FILM MANUFACTURING APPARATUS, AND FILM

CROSS-REFERENCE TO RELATED APPLICATION

This application is a Section 371 of International Application No. PCT/JP2016/082349, filed Oct. 31, 2016, which was published in the Japanese language on May 4, 2017 under International Publication No. WO 2017/073788 A1, which claims priority under 35 U.S.C. § 119(b) to Japanese Application No. 2015-214893, filed Oct. 30, 2015, the disclosures of which are incorporated herein by reference in their entireties.

TECHNICAL FIELD

The present invention relates to (I) a film including (i) a base material layer having a characteristic of being shrunk by heat and (ii) a functional layer which is dried while being restricted by the base material layer and (II) production of the film.

BACKGROUND ART

A production process of producing a film, especially a functional film, includes various drying steps such as drying after washing and drying after coating.

In a case where a separator film to be used as a functional film in a lithium ion secondary battery is taken as an example, Patent Literature 1 discloses a technique for providing one side of a film with a layer for achieving higher heat resistance.

Specifically, Patent Literature 1 discloses (i) coating a film with a heat-resistant coating solution with use of a coating device and then (ii) causing the coated film to pass through a dryer so as to dry the coated film.

CITATION LIST

Patent Literature

Patent Literature 1

Japanese Patent Application Publication, Tokukai, No. 2015-130270 (Publication Date: Jul. 16, 2015)

SUMMARY OF INVENTION

Technical Problem

In a heating step in the above production process of producing a film, the film is heated while a tensile force is applied to the film in a longitudinal direction of the film so as to convey the film. A film, which has been subjected to the heating step, may curl (bend) with respect to a width direction. In addition, among slit films, which are obtained by slitting the film, there may be variances in curling amounts.

It is an object of the present invention to reduce, in production of a film, variances in amounts of width-wise curling that occurs to slit films to be obtained from the film which includes (i) a base material layer having a characteristic of being shrunk by heat and (ii) a functional layer which is dried while being restricted by the base material layer.

Solution to Problem

In order to attain the object, a film producing method in accordance with an embodiment of the present invention is a method of producing a film including a base material layer having a characteristic of being shrunk by heat and a functional layer which is dried while being restricted by the base material layer, the method including: a heating step including heating the film while applying, in a direction in which a length of the film extends, a tensile force to the film so as to convey the film; and a heat treatment step including subjecting the film to a heat treatment while, in a distribution along a width of the film, a center part is higher in temperature than end parts.

A film producing device in accordance with an embodiment of the present invention is a film producing device which produces a film including a base material layer having a characteristic of being shrunk by heat and a functional layer which is dried while being restricted by the base material layer, the film producing device including: a heating device which heats the film while applying, in a direction in which a length of the film extends, a tensile force to the film so as to convey the film; and a heat treatment device which subjects the film to a heat treatment while, in a distribution along a width of the film, a center part is higher in temperature than end parts.

A film in accordance with an embodiment of the present invention is a film including: a base material layer which has a characteristic of being shrunk by heat; and a functional layer which is dried while being restricted by the base material layer, a center part sample from at least one part of a center part of the film being smaller in curling amount with respect to a width of the film than an end part sample from at least one part of an end part of the film.

A film in accordance with an embodiment of the present invention is a film including: a base material layer which has a characteristic of being shrunk by heat; and a functional layer which is dried while being restricted by the base material layer, a standard deviation in curling amount with respect to a width of the film being not more than 1 mm between (i) two samples from respective end parts located 15 cm away from corresponding ends of the film toward a center part of the film and (ii) a sample from the center part of the film.

Advantageous Effects of Invention

With a film producing method in accordance with an embodiment of the present invention and a film producing device in accordance with an embodiment of the present invention, it is advantageously possible to provide stability to quality of a slit film. With a film in accordance with an embodiment of the present invention, it is possible to increase a yield in production of a battery.

DESCRIPTION OF EMBODIMENTS

The following description will discuss an embodiment of the present invention by taking a lithium ion secondary battery separator film (which may be referred to as "separator") as an example.

Note that the present invention is applicable not only to drying during production of a lithium ion secondary battery separator film but also to drying during production of a film different from a lithium ion secondary battery separator film.

Embodiment 1

A lithium ion secondary battery will be described first with reference to FIGS. 1 through 3.

(Configuration of Lithium Ion Secondary Battery)

Nonaqueous electrolyte secondary batteries, typically lithium ion secondary batteries, have high energy density. Therefore, nonaqueous electrolyte secondary batteries are currently widely used as (i) batteries for use in devices such as personal computers, mobile phones, and mobile information terminals, (ii) batteries for use in moving bodies such as automobiles and airplanes, and (iii) stationary batteries contributing to stable electric power supply.

Figure 1:
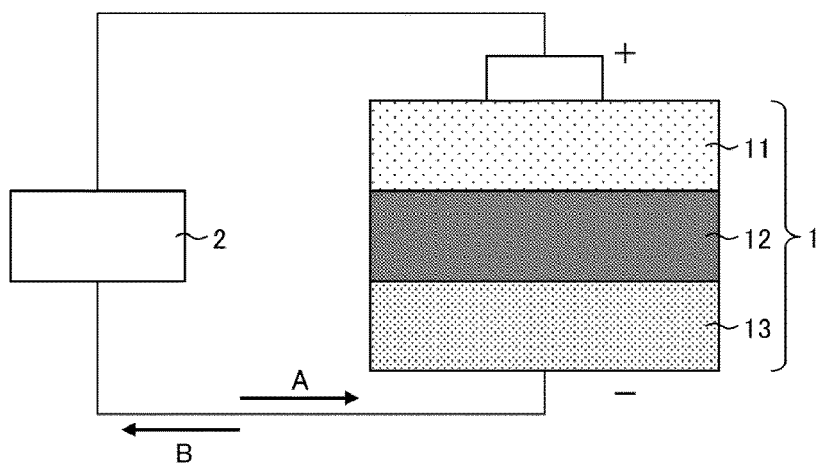
FIG. 1 is a diagram schematically illustrating a cross-sectional configuration of a lithium ion secondary battery.

FIG. 1 is a diagram schematically illustrating a cross-sectional configuration of a lithium ion secondary battery 1.

As illustrated in FIG. 1, the lithium ion secondary battery 1 includes a cathode 11, a separator 12, and an anode 13. Between the cathode 11 and the anode 13, an external device 2 is connected outside the lithium ion secondary battery 1. While the lithium ion secondary battery 1 is being charged, electrons move in a direction A. On the other hand, while the lithium ion secondary battery 1 is being discharged, electrons move in a direction B.

(Separator)

The separator 12 is provided so as to be sandwiched between the cathode 11 and the anode 13, which are a positive electrode and a negative electrode, respectively, of the lithium ion secondary battery 1. While the separator 12 is separating the cathode 11 and the anode 13 from each other, the separator 12 allows lithium ions to move between the cathode 11 and the anode 13. The separator 12 is made of, for example, polyolefin such as polyethylene or polypropylene.

Figure 2:
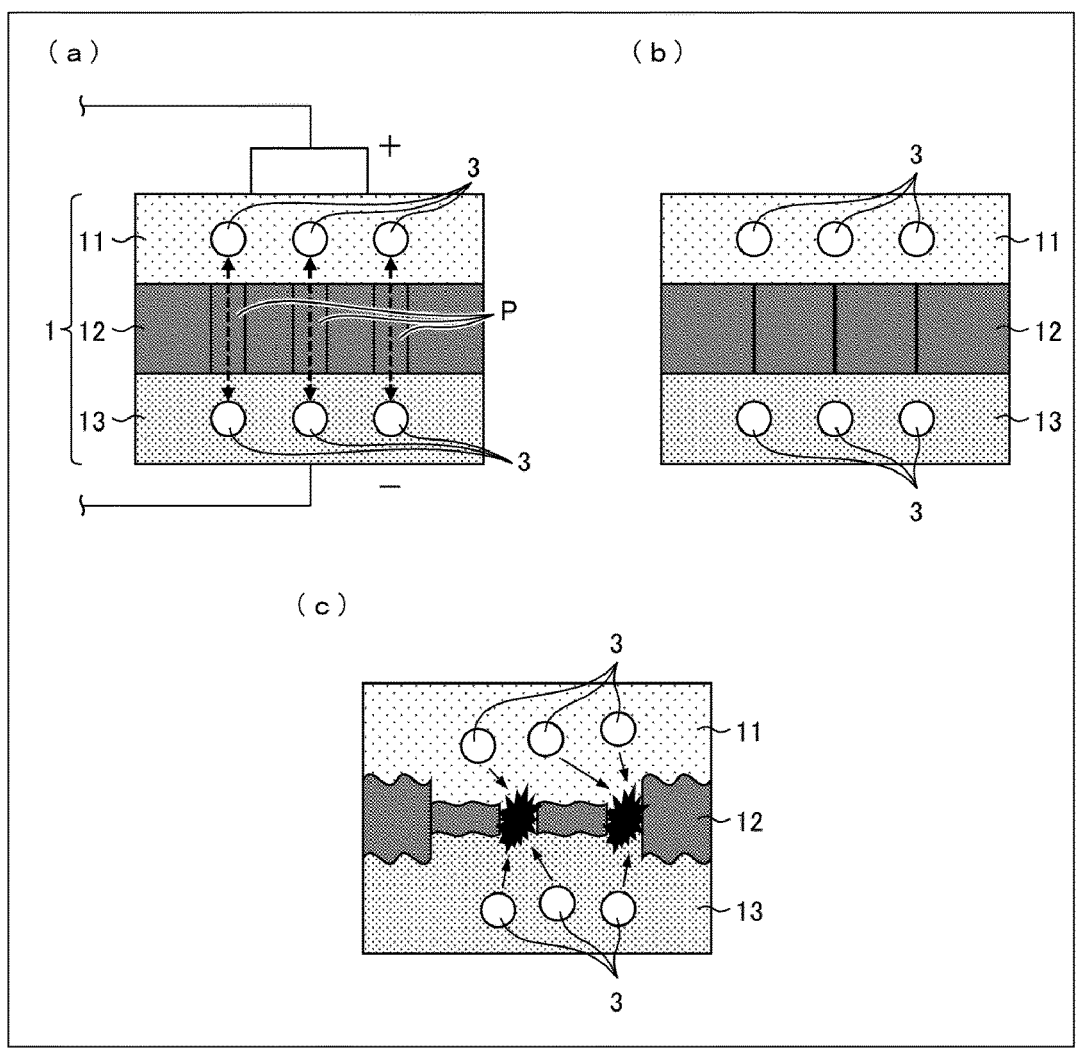
FIG. 2 is a set of diagrams schematically illustrating respective states of the lithium ion secondary battery illustrated in FIG. 1.

FIG. 2 is a set of diagrams (a) through (c) schematically illustrating respective states of the lithium ion secondary battery 1 illustrated in FIG. 1. (a) of FIG. 2 illustrates an ordinary state of the lithium ion secondary battery 1. (b) of FIG. 2 illustrates a state in which a temperature of the lithium ion secondary battery 1 has risen. (c) of FIG. 2 illustrates a state in which the temperature of the lithium ion secondary battery 1 has sharply risen.

As illustrated in (a) of FIG. 2, the separator 12 has multiple pores P. Ordinarily, lithium ions 3 in the lithium ion secondary battery 1 can move back and forth through the pores P.

Note that there may be a case where, for example, the temperature of the lithium ion secondary battery 1 rises due to, for example, (i) excessive charging of the lithium ion secondary battery 1 or (ii) a high current caused by a short circuit that occurs in the external device. In such a case, the separator 12 melts or softens, so that the pores P are blocked (see (b) of FIG. 2). As a result, the separator 12 shrinks. This stops the back-and-forth movement of the lithium ions 3, and consequently stops the above temperature rise.

However, in a case where the temperature of the lithium ion secondary battery 1 sharply rises, the separator 12 drastically shrinks. In this case, as illustrate in (c) of FIG. 2, the separator 12 may be destroyed. Then, the lithium ions 3 leak out from the separator 12 thus destroyed, so that the lithium ions 3 do not stop moving back and forth. Consequently, the temperature continues rising.

(Function-Provided Separator)

Figure 3:
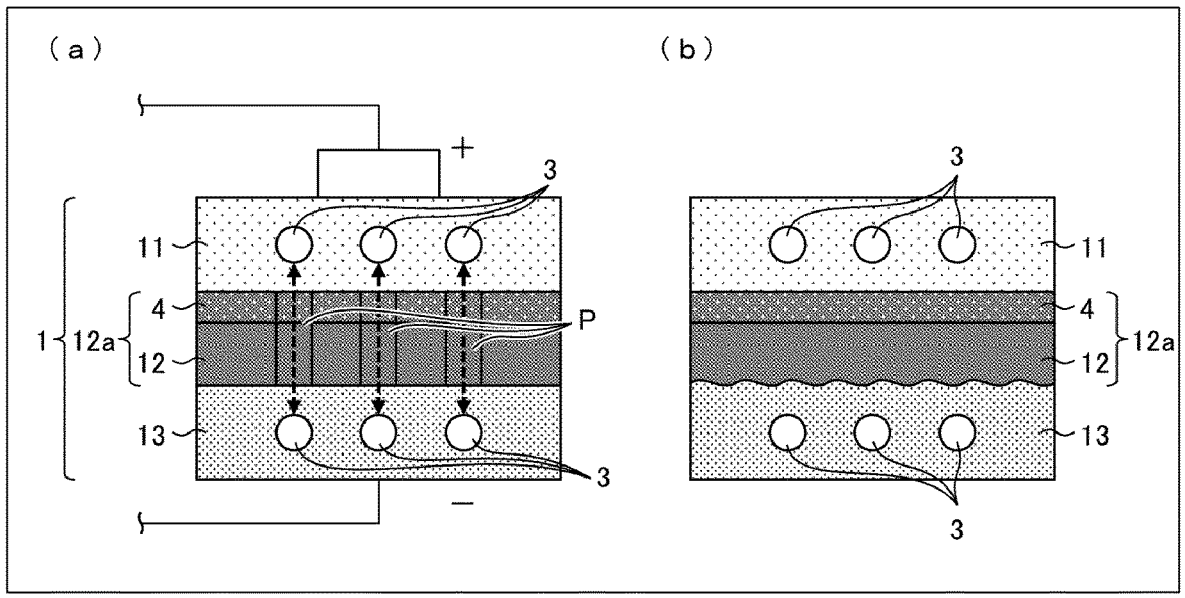
FIG. 3 is a set of diagrams schematically illustrating respective states of a lithium ion secondary battery having another configuration.

FIG. 3 is a set of diagrams (a) through (c) schematically illustrating respective states of a lithium ion secondary battery 1 having another configuration. (a) of FIG. 3 illustrates an ordinary state of the lithium ion secondary battery 1. (b) of FIG. 3 illustrates a state in which the temperature of the lithium ion secondary battery 1 has sharply risen.

As illustrated in (a) of FIG. 3, the lithium ion secondary battery 1 can further include a heat-resistant layer 4. The heat-resistant layer 4 can be provided on the separator 12. (a) of FIG. 3 illustrates a configuration in which the heat-resistant layer 4, which serves as a functional layer, is provided on the separator 12. In the following description, a film, in which the heat-resistant layer 4 is provided on the separator 12, will be regarded as a function-provided separator 12a. In addition, the separator 12 of the function-provided separator 12a will be regarded as a base material for the functional layer.

According to the configuration illustrated in (a) of FIG. 3, the heat-resistant layer 4 is disposed on one side of the separator 12 which one side faces the cathode 11. Alternatively, the heat-resistant layer 4 can be disposed on the other side of the separator 12 which other side faces the anode 13. Alternatively, the heat-resistant layer 4 can be disposed on each of both surfaces of the separator 12. The heat-resistant layer 4 also has pores that are similar to the pores P. Ordinarily, the lithium ions 3 move back and forth through the pores P and the pores of the heat-resistant layer 4. The heat-resistant layer 4 contains, for example, wholly aromatic polyamide (aramid resin) as a material thereof.

As illustrated in (b) of FIG. 3, even in a case where the temperature of the lithium ion secondary battery 1 sharply rises and, as a result, the separator 12 melts or softens, the shape of the separator 12 is maintained because the heat-resistant layer 4 supports the separator 12. Therefore, such a sharp temperature rise results in only melting or softening of the separator 12 and consequent blocking of the pores P. This stops the back-and-forth movement of the lithium ions 3 and consequently stops the above-described excessive discharging or excessive charging. In this way, the separator 12 can be prevented from being destroyed.

(Flow of Production of Function-Provided Separator)

A flow of production of a function-provided separator (functional film) will be described next.

Figure 4:
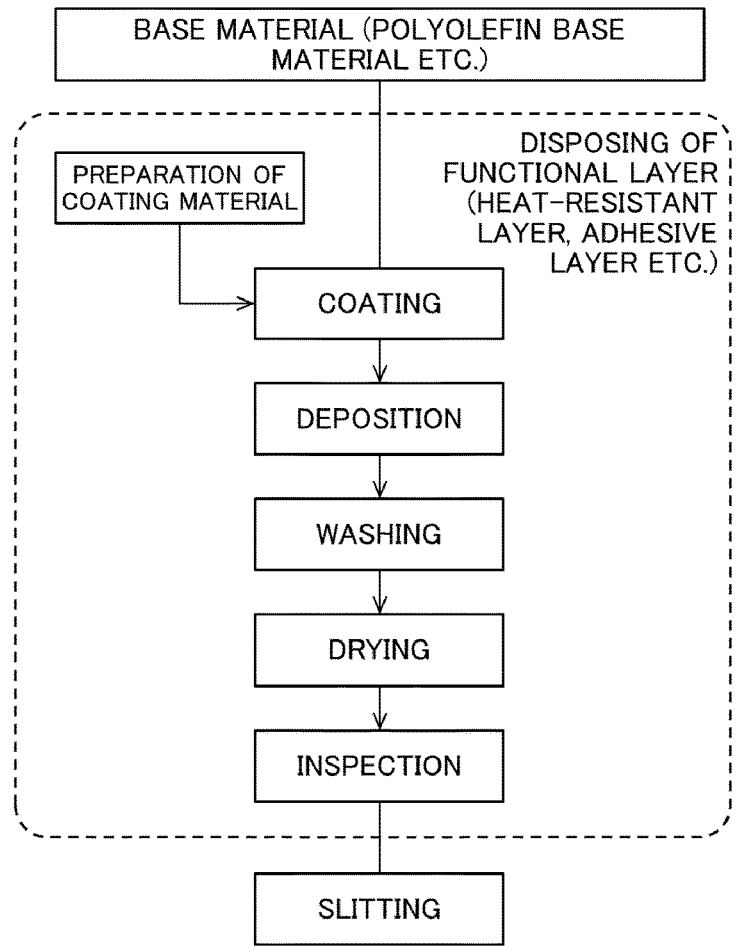
FIG. 4 is a view illustrating a flow of a process of producing a function-provided separator.

FIG. 4 is a flow chart schematically showing a process of producing the function-provided separator.

The base material is, for example, a film made of polyolefin. The functional layer can be a heat-resistant layer which serves as an adhesive layer.

The functional layer is disposed on the base material by coating the base material with, for example, a coating material that is suited to the functional layer, and drying the coated base material.

FIG. 4 illustrates a flow of production of a function-provided separator in a case where the functional layer is a heat-resistant layer. According to the illustrated flow, wholly aromatic polyamide (aramid resin) is used as a material for the heat-resistant layer, and is disposed on a polyolefin base material.

This flow includes the steps of coating, deposition, washing, and drying. The heat-resistant layer, which has been disposed on the base material, is subjected to inspection and then subjected to slitting.

Each step included in the process of producing a function-provided separator will be described next.

(Process of Producing Function-Provided Separator)

For example, the process of producing a function-provided separator includes (a) a base material (separator) unwinding and inspecting step, (b) a coating material (functional material) applying step, (c) a deposition step carried out by, for example, humidity deposition, (d) a washing step, (e) a water removing step, (f) a drying step, (g) a coated article inspecting step, and (h) a winding step that are carried out in this order. Alternatively, the process of producing a function-provided separator can include not only the above steps (a) through (h) but also (I) a base material producing (film-forming) step before the step (a) and/or (II) a slitting step after the step (h).

The following description will discuss the base material production process, which is a process preceding the step (a), and then discuss the steps (a) through (h) in this order.

(Base Material Production Process)

Production of a separator original sheet film as a base material will be described below by using an example in which the separator original sheet film contains polyethylene as a main material thereof.

A production method illustrated is a method in which (i) a film is formed by adding a solid or liquid pore-forming agent to thermoplastic resin and then (ii) the pore-forming agent is removed by use of an appropriate solvent. Specifically, the base material which is made of polyethylene resin containing ultra-high molecular weight polyethylene is produced by a method in which the following steps (A) through (D) are carried out in this order.

(A) Kneading Step

This is a step of obtaining a polyethylene resin composition by kneading ultra-high molecular weight polyethylene and an inorganic filler such as calcium carbonate.

(B) Sheet Forming Step

This is a step of forming a film by use of the polyethylene resin composition obtained in the kneading step.

(C) Removal Step

This is a step of removing the inorganic filler from the film obtained in the sheet forming step.

(D) Stretching Step

This is a step of obtaining the base material by stretching the film obtained in the removal step.

According to the production method above, multiple fine pores are formed in the film in the (C) removal step. Then, fine pores in the film stretched in the (D) stretching step serve as the pores P described earlier. This allows the base material to be formed so as to be a polyethylene microporous film having certain thickness and certain air permeability. Alternatively, the step (D) can be carried out prior to the step (C).

In the (A) kneading step, it is possible to knead 100 parts by weight of the ultra-high molecular weight polyethylene, 5 parts by weight to 200 parts by weight of low molecular weight polyolefin having a weight-average molecular weight of not more than 10,000, and 100 parts by weight to 400 parts by weight of the inorganic filler.

Note that even in a case where the base material contains another material, the base material can be produced by employing a similar production process. Note also that the method of producing the base material is not limited to the above method in which the pore forming agent is removed. Rather, various methods can be used to produce the base material.

Next, the steps (a) through (h), by which the base material production process is followed, will be described in this order. Note that although the steps (a) through (h) proceed in this order, these steps can be partially omitted depending on the type of functional material.

(a) Base Material Unwinding and Inspecting Step

This step includes the steps of (A) unwinding, from a roller, the separator original sheet film to serve as the base material of the function-provided separator and (B) inspecting the unwound base material in advance of the subsequent coating step.

(b) Coating Material Applying Step

This is a step of applying a coating material, which serves as the functional material, to the base material which has been unwound in the step (a).

A method of disposing, on the base material, the heat-resistant layer serving as the functional layer will be described below. Specifically, the base material is coated with a coating material which serves as a coating material for the heat-resistant layer and which is obtained by dispersing alumina particles in an NMP (N-methyl-2-pyrrolidone) solution of aramid. Note that the heat-resistant layer is not limited to the above-described aramid heat-resistant layer. For example, the base material can be coated with a coating material which serves as a coating material for the heat-resistant layer and which is obtained by dispersing alumina particles in carboxymethyl cellulose.

A method of coating the base material with the coating material is not limited to any particular one, provided that uniform wet coating can be carried out. Various methods can be employed as the method. Examples of the method encompass a capillary coating method, a spin coating method, a slit die coating method, a spray coating method, a dip coating method, a roller coating method, a screen printing method, a flexo printing method, a bar coater method, a gravure coater method, or a die coater method.

The heat-resistant layer 4 has a thickness which can be controlled by (I) adjusting a thickness of a coating wet film, (II) a solid content concentration represented by a sum of (i) a binder concentration in a coating solution and (ii) a filler concentration in the coating solution, and/or (III) a ratio of the filler to the binder.

Note that the functional layer can be provided on only one side of the base material or on both sides of the base material.

(c) Deposition Step (Humidity Deposition Step)

This is a step of solidifying the coating material which was applied in the step (b). In a case where the coating material is an aramid coating material, aramid is deposited by, for example, subjecting a coating surface to humidity. This allows an aramid heat-resistant layer to be formed on the base material.

(d) Washing Step

This is a step which is carried out after the solidifying the coating material and in which the functional layer and the base material are washed. In a case where the functional layer is an aramid heat-resistant layer, a washing liquid is suitably used. Examples of such a washing liquid encompass water, an aqueous solution, and an alcohol-based solution.

(e) Water Removing Step

This is a step of removing water from the function-provided separator which has been washed in the step (d).

The water is removed so as to remove, before the subsequent drying step, the washing liquid (e.g., water) which is stuck on the function-provided separator. This allows the function-provided separator to be easily dried, and therefore prevents the function-provided separator from being insufficiently dried.

(f) Drying Step

This is a step of drying the function-provided separator from which water has been removed.

Examples of a method of drying the function-provided separator encompass, but are not particularly limited to, various methods such as (I) a method of bringing the function-provided separator into contact with a heated roller and (II) a method of blowing hot air onto the function-provided separator.

(g) Coated Article Inspecting Step

This is a step of inspecting the dried function-provided separator.

In a case where a defective part is appropriately marked during the inspection, it is possible to easily recognize a position of a defect of a product.

(h) Winding Step

This is a step of winding the function-provided separator which has been inspected.

The winding can be carried out by using, for example, a cylindrical core as needed.

The wound function-provided separator can be shipped, for example, in the form of an original sheet without changing its broad width. Alternatively, as necessary, the wound function-provided separator can be slit into slit separators each having a predetermined width.

(Drying Step)

A drying method and the like in accordance with an embodiment of the present invention will be described next in detail. The present invention relates to the drying step of the process above.

As described above, the process of producing the function-provided separator includes the (f) drying step. The (f) drying step is to be carried out so as to remove, by drying, the washing liquid which became stuck on the function-provided separator in the (d) washing step.

A method of the drying is not limited to any particular one, and can be roller heating, for example. Specifically, roller heating is a method of drying a function-provided separator by bringing the function-provided separator into contact with a heated roller. The roller is heated by, for example, injecting a heating medium such as warm water into the roller and circulating the heating medium.

Figure 5:
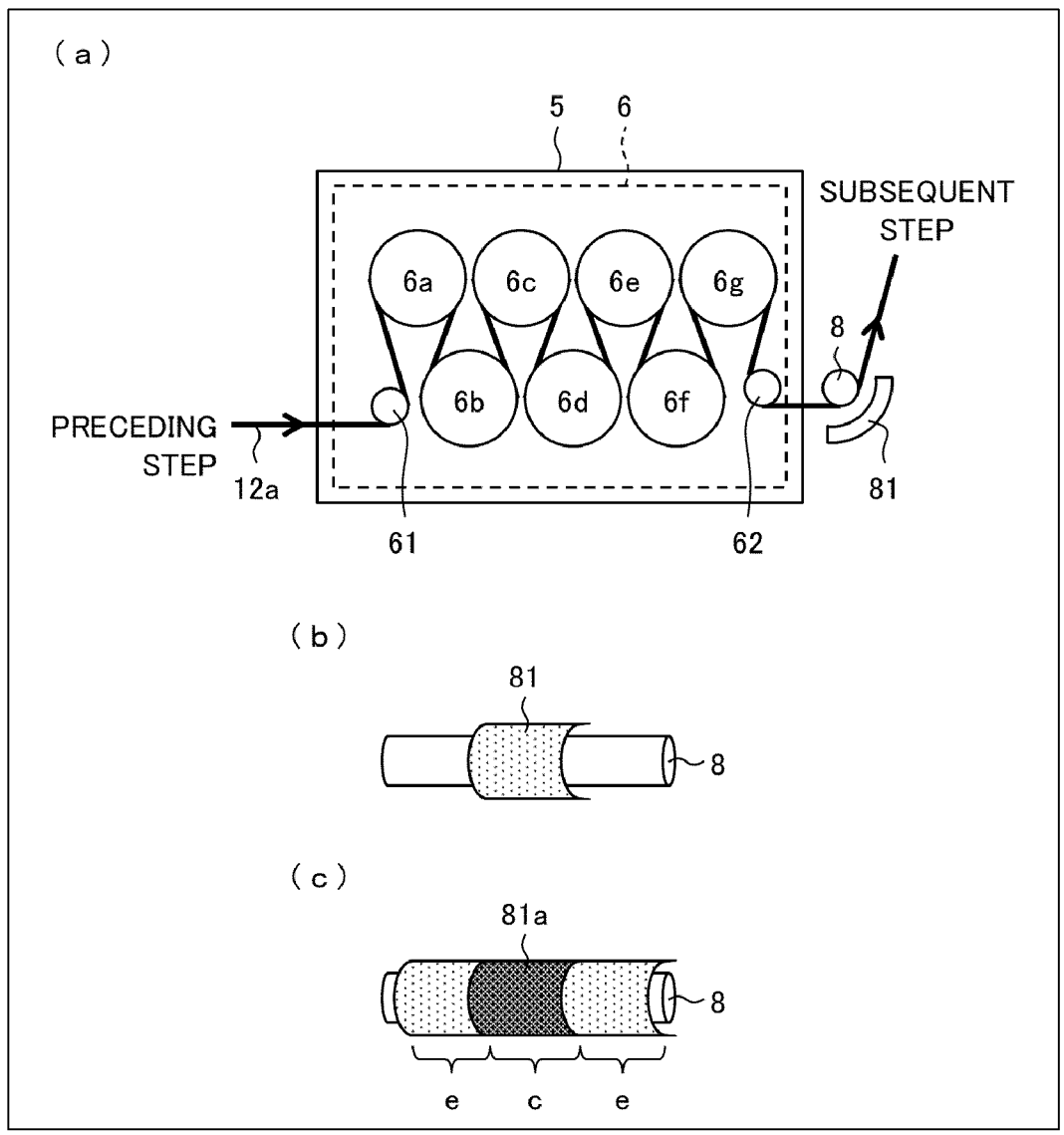
FIG. 5 is a view schematically illustrating a drying step included in a film producing method in accordance with an embodiment of the present invention.

FIG. 5 is a set of views schematically illustrating the drying step included in the film producing method in accordance with the present embodiment. (a) of FIG. 5 illustrates the entire drying step. (b) of FIG. 5 illustrates a heating step included in the drying step. (c) of FIG. 5 illustrates a variation of the heating step.

As illustrated in (a) of FIG. 5, in the drying step, a function-provided separator 12a is conveyed, which was washed in the washing step which is a preceding step. On the function-provided separator 12a thus washed, a washing liquid is remaining. In the drying step, the function-provided separator 12a on which the washing liquid is remaining is dried by a drying device 5. The film drying step in accordance with the present embodiment includes the heating step and a heat treatment step.

(Heating Step)

The heating step is a step of vaporizing, by heating, a washing liquid remaining on the function-provided separator 12a. As illustrated in (a) of FIG. 5, the drying device 5 includes a drying chamber 6. Outside the drying device 5, a roller 8 and an IR heater 81 are provided.

The drying chamber 6 includes a roller 61, rollers 6a through 6g, and a roller 62. The roller 61, rollers 6a through 6g, the roller 62, and the roller 8 each extend, in a depth-wise direction of (a) of FIG. 5, longer than a width of the function-provided separator 12a.

The function-provided separator 12a, which has been subjected to the preceding step, is conveyed into the drying chamber 6. In the drying chamber 6, the function-provided separator 12a is conveyed while coming into contact with the roller 61, the rollers 6a through 6g, and the roller 62 in this order.

In the rollers 6a through 6g, a heating medium is circulated by a heating medium circulating device (not illustrated). This maintains a surface temperature of each of the rollers 6a through 6g within a range of not less than 60° C. and not more than 100° C. By coming into contact with the rollers 6a through 6g, the function-provided separator 12a is heated uniformly with respect to a width direction. Note that the term "width direction" means a direction which is substantially perpendicular to (i) a direction in which the function-provided separator is conveyed and (ii) a direction in which a thickness of the function-provided separator extends.

With this configuration, the washing liquid remaining on the function-provided separator 12a is heated so as to vaporize. The washing liquid, which has vaporized, is then discharged out of the drying device 5 by an exhaust device (not illustrated).

Note that if the drying step in accordance with the present embodiment does not include the heat treatment step described later, then a function-provided separator 12a, which has been subjected to the heating step described above, may have a curling amount which varies with respect to the width direction. In other words, if the heat treatment step described later is not included, then a plurality of slit separators, which are obtained from a function-provided separator 12a after the drying and which have a predetermined width, may include a slit separator(s) having a large curling amount(s) and a slit separator(s) having a small curling amount(s). The following description will discuss a mechanism by which heat causes variances in curling amounts, with respect to the width direction, of slit separators obtained from the function-provided separator 12a which is a laminated resin film. Hereinafter, a curling amount(s), with respect to the width direction, of the function-provided separator 12a or of slit separators of the function-provided separator 12a will be referred to simply as "curling amount(s)".

(Mechanism of Occurrence of Curling)

Figure 6:
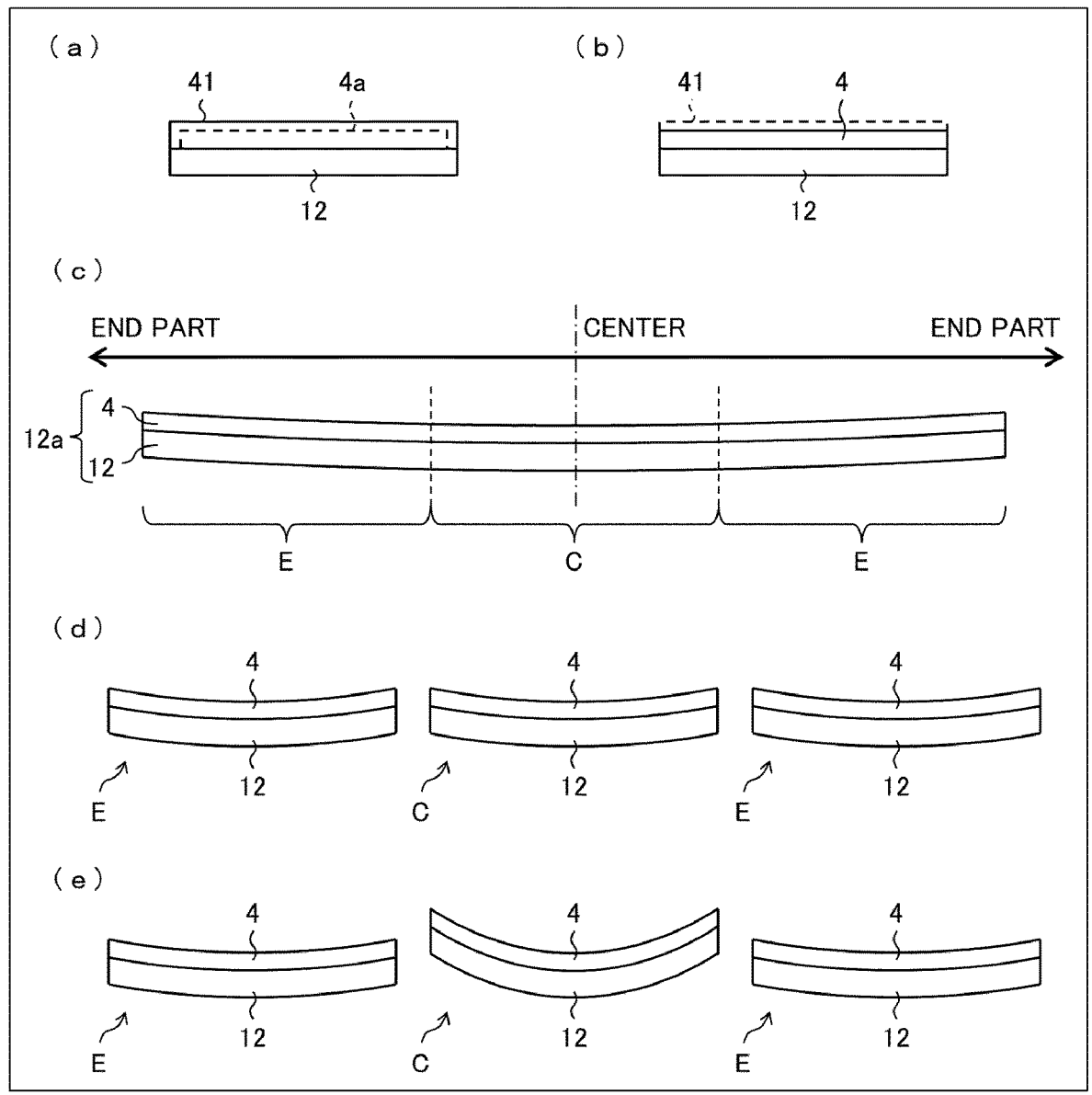
FIG. 6 is a set of plan views and cross-sectional views for describing a mechanism by which a resin film curls.

FIG. 6 is a set of views (a) through (e) for describing the mechanism by which variances in a curling amount of the function-provided separator 12a occur. (a) through (d) of FIG. 6 illustrate a mechanism of the occurrence of curling. (e) of FIG. 6 illustrates a mechanism of the occurrence of variances in curling amount.

As illustrated in (a) of FIG. 6, a liquid functional layer applied to a separator 12 which serves as a base material layer or a pre-dried functional layer 41 containing a washing liquid after deposition each have a tendency to shrink during a drying process. If the separator 12 is not present, then the pre-dried functional layer 41, when dried, shrinks as indicated by a broken line 4a.

However, the pre-dried functional layer 41 is dried while being restricted by the separator 12, so that a heat-resistant layer 4, which is illustrated in (b) of FIG. 6 and which serves as a functional layer, is formed. This causes the heat-resistant layer 4 to retain stress by which the heat-resistant layer 4 has a tendency to shrink. As a result, as illustrated in (c) of FIG. 6, a function-provided separator 12a serving as a laminated resin film is curled so that the heat-resistant layer 4 is located at an inner side of the curl.

(Mechanism of Occurrence of Variance in Curling Amount)

It is assumed here that the function-provided separator 12a illustrated in (c) of FIG. 6 is separated, with respect to the width direction, into three separators in a slitting step. In so doing, in a case where there is no variance in curling amount, there is substantially a match, as illustrated in (d) of FIG. 6, between (I) a curling amount of a slit film obtained from each end part E located at an end part, with respect to the width direction, of the function-provided separator 12a and (II) a curling amount of a slit film obtained from a center part C located at a center part, with respect to the width direction, of the function-provided separator 12a.

In practice, however, the curling amount of the slit film obtained from the center part C is larger than the curling amount of the slit film obtained from the end part E (see (e) of FIG. 6). This is because (I) the separator 12, which serves as a base material layer of the function-provided separator 12a, has a characteristic of being shrunk by heat and (II) the separator 12 does not shrink uniformly in the heating step with respect to the width direction. The shrinkage becomes larger toward an end part of the separator 12, and becomes smaller toward a center part of the separator 12.

For example, assume a case where (i) a slit film obtained from the center part C and a slit film obtained from the end part E are each placed on a horizontal surface with a separator 12-side facing down and (ii) a comparison is made between the slit films in terms of a distance between the horizontal surface and an endmost part of the slit film with respect to the width direction. In this case, the results tend to show that a curling amount of the slit film obtained from the center part C is larger than that of the slit film obtained from the end part E.

Note that a curling state of the slit film illustrated in (e) of FIG. 6 is an example. In practice, there are cases where a slit film is curled to a greater extent than in this example, so as to form a cylindrical form in which a heat-resistant layer 4 is located at an inner surface side. In such a case also, a curling amount of a slit film obtained from the center part C tends to be larger than that of a slit film obtained from the end part E.

As a result, at the end part E of the function-provided separator 12a, the curling amount is small due to a balance between (i) a shrinkage amount of the separator 12 and (ii) a shrinkage amount of the heat-resistant layer 4 during the drying process. In addition, since the shrinkage amount of the separator 12 is small at the center part C of the function-provided separator 12a, the heat-resistant layer 4 is restricted. This causes the curling amount to be large.

(Technique for Counterbalancing Variance in Curling Amount)

The inventors of the present invention focused on the mechanism of the occurrence of variances in curling amounts described above, and found that the variances in curling amounts can be counterbalanced by subjecting a function-provided separator 12a to a certain heat treatment. Specifically, the heat treatment step is carried out so that the center part C of the function-provided separator 12a is heated more intensely than is the end part E of the function-provided separator 12a (described later). This causes a shrinkage amount at a center part of a separator 12 to be similar to a shrinkage amount at an end part of the separator 12.

(Heat Treatment Step)

The heat treatment step is a step in which the function-provided separator 12a is locally heated so as to remove a curling of the function-provided separator 12a in order to counterbalance a variance in curling amount. The heating is carried out with use of the IR heater 81 which heats the function-provided separator 12a by irradiation with infrared rays. As illustrated in (b) of FIG. 5, the IR heater 81 is provided so as to cover a center part, with respect to the width direction, of a part of the function-provided separator 12a which part is in contact with the roller 8. Note that function-provided separator 12a is omitted in (b) of FIG. 5.

Figure 7:
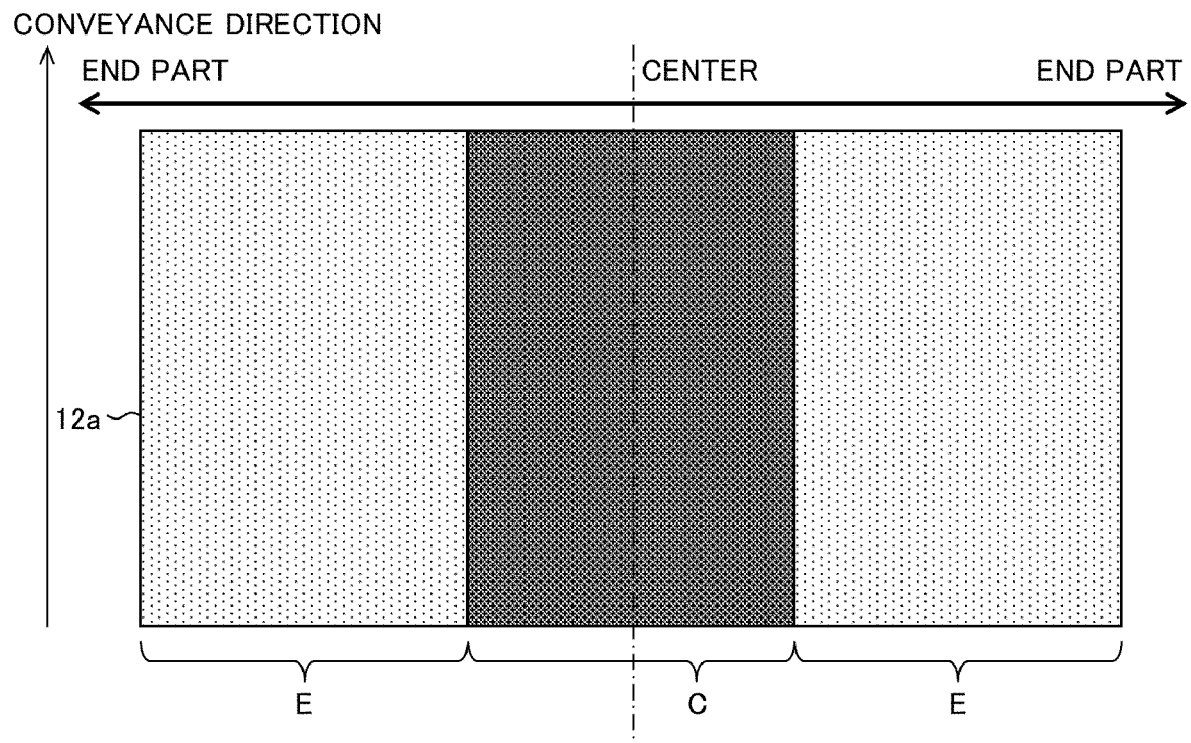
FIG. 7 is a plan view illustrating a distribution of quantities of heat applied to a function-provided separator which is heated by an IR heater in a heat treatment step included in the drying step illustrated in FIG. 5.

FIG. 7 is a plan view illustrating a distribution of quantities of heat applied to the function-provided separator 12a which is heated by the IR heater 81 in the heat treatment step illustrated in (b) of FIG. 5. In FIG. 7, end parts E of the function-provided separator 12a are each a part which has been heated by the rollers 6a through 6g illustrated in (a) of FIG. 5. Meanwhile, a center part C is a part which has been heated by the rollers 6a through 6g and by the IR heater 81 illustrated in (b) of FIG. 5.

Immediately after the function-provided separator 12a passes the roller 8 illustrated in (a) of FIG. 5, a temperature of the center part C is higher than a temperature of each of the end parts E.

(Evaluation of Curling Amount)

Figure 9:
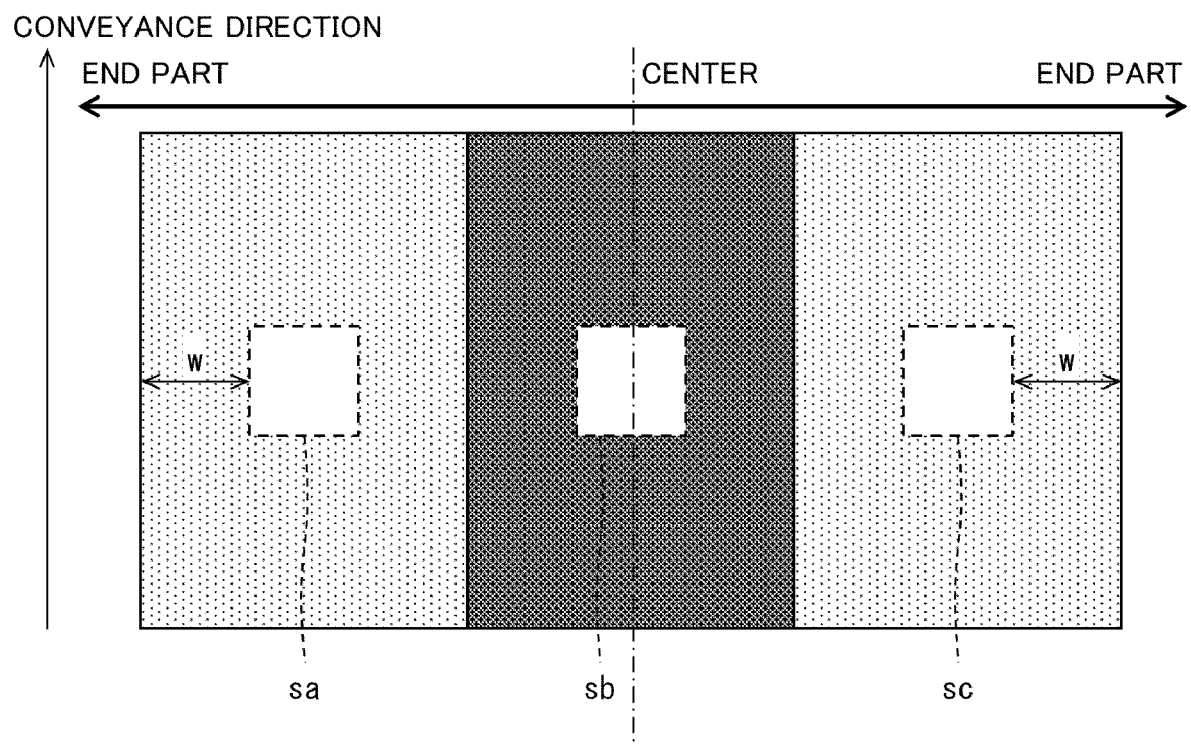
FIG. 9 is a plan view illustrating positions of sample pieces obtained from the function-provided separator of FIG. 7 for evaluation of curling amounts.

FIG. 9 is a plan view illustrating positions of sample pieces obtained from the function-provided separator 12a of FIG. 7 for evaluation of curling amounts. Hereinafter, the function-provided separator 12a will also be referred to simply as "film".

8 cm×8 cm sample pieces were cut out with use of a cutter, and were each left for 5 minutes at a room temperature of 25° C. and at a humidity of 50%. Then, a distance of each film end from a floor surface in a traverse direction (direction perpendicular to (i) a direction in which the film is conveyed and (ii) a direction in which a thickness of the film extends) as a result of warpage was measured as a curling amount. The curling amount to be evaluated is a larger one of the distances in the traverse direction from one end and the other end of the film to the floor surface as a result of warpage.

Note that a curling amount is an amount by which a film warps while there is a balance between (i) force by which the film warps and (ii) the gravity. Note also that a curling amount of a sample piece in a traverse direction is not affected by a length of the sample piece in a machine direction.

As illustrated in FIG. 9, curling amount measurement in accordance with the present embodiment was carried out at the total of the following three parts: end parts sa and sc and a center part sb of the film. The letter w indicates a length in the traverse direction between the end part sa and a corresponding film end. According to the example of the present embodiment, the letter w also indicates a length in the traverse direction between the end part sb and corresponding film end. According to the present embodiment, the length w is 15 cm.

Note that a "center part" of a film means a part which includes an imaginary center line extending in a width direction which is substantially perpendicular to (i) a direction in which the film is conveyed and (ii) a direction in which a thickness of the film extends. An "end part" of the film means a part which is located further away in the width direction from the center line than is the center part.

In a case where a curling amount is not less than 4 mm (as measured according to a measuring method described later), a film is likely to be folded at a rolled part while the film is being conveyed. In particular, in a case where a film is folded while being wound during production of a battery, it becomes likely that a yield in production of the battery decreases. For example, in such a case, a short circuit may occur in the battery, so that the battery may no longer function as a battery. There are therefore demands that a curling amount in a traverse direction be prevented from exceeding 3 mm.

Production of Porous Film

With 100 parts by weight of polyethylene powder (GUR4032, manufactured by Celanese Corporation), 43 parts by weight of olefin-based wax powder (FNP115, manufactured by Nippon Seiro Co., Ltd.) and 170 parts by weight of calcium carbonate (manufactured by Maruo Calcium Co., Ltd. and having an average particle diameter, measured by SEM, of 0.10 µm) were mixed in a Henschel mixer. Then, a resultant mixture was kneaded with use of a twin screw kneading extruder while a temperature was set at a cylinder temperature of 230° C. This resulted in a polyolefin resin composition. The polyolefin resin composition was rolled with use of a pair of rollers each having a surface temperature of approximately 150° C. and rotating at an identical circumferential speed. This produced a sheet (1).

Figure 10:
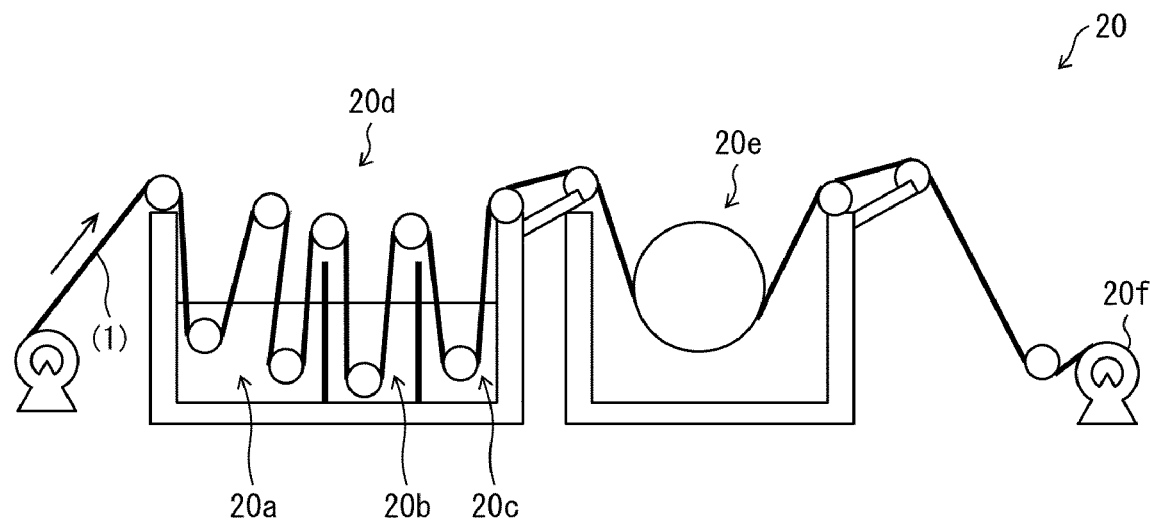
FIG. 10 is a view schematically illustrating a configuration of a device which produces a PE porous film from a sheet.

FIG. 10 is a view schematically illustrating a configuration of a device 20 which produces a polyethylene (PE) porous film from a sheet (1). The device 20 includes an acid solution tank 20a, an alkaline solution tank 20b, a water tank 20c, guide rollers 20c, a drying drum (heating drum) 20e, and a winding machine 20f. With use of the device 20, the calcium carbonate in the sheet (1) was removed. The sheet (1) was conveyed with use of the rollers and immersed for 15 minutes in the acid solution tank 20a containing an aqueous hydrochloric acid solution (in which 2 mol/L to 4 mol/L of hydrochloric acid and 0.1% by weight to 0.5% by weight of a nonionic surfactant were contained), so that the calcium carbonate was removed. Then, the sheet was neutralized by being immersed for 2 minutes in alkaline solution tank 20b containing an aqueous sodium hydroxide solution (0.1 mol/L to 2 mol/L). Then, the sheet was washed with water for 5 minutes in the water tank 20c which was heated to 50° C. Finally, the sheet was dried by being brought into contact with the rollers, and was then wound. Then, the sheet was stretched to 7 times with use of a tenter (at a stretching temperature of 100° C. and a heat fixation temperature of 122.5° C.). This produced a PE porous film (A).

Preparation of Heat-Resistant Layer Liquid

Synthesis of Para-Aramid (Poly(Paraphenylene Terephthalamide))

Poly(paraphenylene terephthalamide) was produced with the use of a 3-liter separable flask having a stirring blade, a thermometer, a nitrogen incurrent canal, and a powder addition port. 2200 g of N-methyl-2-pyrrolidone (NMP) and 68.23 g of paraphenylenediamine were introduced into the flask which had been sufficiently dried, and were completely dissolved. To a resultant solution, 124.97 g of terephthalic acid dichloride was added. A resultant solution was a solution having a para-aramid concentration of 6%. The para-aramid solution was partially sampled and reprecipitated with water. This produced para-aramid which had an intrinsic viscosity of 2.02 dl/g.

Preparation of Coating Solution

Into a flask, 100 g of a para-aramid solution that had been polymerized in advance was weighed out. Then, 243 g of NMP was added. Then, a resultant mixture was stirred. With the above solution, 6 g (relative to 100 parts by weight of para-aramid) of AEROXIDE Alu C (manufactured by Nippon Aerosil Co., Ltd.) and 6 g (relative to 100 parts by weight of para-aramid) of Advanced Alumina AA-03 (manufactured by Sumitomo Chemical Co., Ltd.) were mixed. This resulted in a slurry coating solution.

Comparative Example 1

A roll (width: 1 m, length: 1000 m) of a PE porous film (A) was attached to a wind-off machine. While the roll was being pulled out at a tensile force of 120 N/m and a line speed of 30 m/min, (i) a bottom surface of the porous film (A) was coated with NMP with use of a micro-gravure coater and (ii) a top surface of the porous film (A) was coated with a prepared coating solution with use of a bar coater so that the coating will have a thickness of 100 µm. Then, the film thus coated was passed through a vessel having a constant temperature and humidity (temperature: 50° C., relative humidity: 70%) so that para-aramid from was deposited from the coating solution. Then, the resultant film was passed through a water washing device, so that the NMP and the calcium chloride contained in the film were removed. Then, while the resultant film was blown with hot air with use of a Yankee dryer, the film was passed through the rollers 6a through 6g (surface temperature: 88° C. to 90° C.) illustrated in FIG. 5 so that a water content was removed by drying. Then, the resultant film was wound by a winding tensile force of 130 N/m. This produced a function-provided separator. The results of measurement of curling amounts of the function-provided separator thus produced are shown in Table 1.

Example 1

A function-provided separator was produced as in Comparative Example 1 except that the following was carried out. That is, after a film passed through the rollers 6a through 6g (surface temperature: 88° C. to 90° C.), the resultant film was heated by IR heaters (INFRASTAIN, manufactured by NGK INSULATORS, LTD.) for approximately 5 seconds so that a surface at a center part of the film (i.e., a central ⅓ part when a width of the film is divided into three parts) would become 70° C. In so doing, (I) the IR heaters were arranged so that (i) 16 lines of the IR heaters were provided within a range of 2.5 m in a direction in which the film was conveyed and (ii) 6 lines of the IR heaters were provided in a direction in which the width of the film extends and (II) temperatures of two central lines of IR heaters were set to 500° C. Then, the resultant film was cooled. Then, the resultant film was wound up at a winding tensile force of 130 N/m. This produced the function-provided separator. The results of measurement of curling amounts of the function-provided separator thus produced are shown in Table 1.

Example 2

A function-provided separator was produced as in Example 1 except that the following was carried out. That is, a film was heated by IR heaters for approximately 5 seconds so that (i) a surface at a center part of the film (i.e., a central ⅓ part when a width of the film is divided into three parts) would become 70° C. and (ii) surfaces of both ends of the film (i.e., non-central ⅓ parts when the width of the film is divided into three parts) would become 50° C. In so doing, (i) temperatures of two central lines of IR heaters were set to 500° C. and (ii) temperatures of two lateral sets of two lines of IR heaters were set to 300° C. Then, the resultant film was cooled. Then, the resultant film was wound up at a winding tensile force of 130 N/m. This produced the function-provided separator. The results of measurement of curling amounts of the function-provided separator thus produced are shown in Table 1.

Example 3

A function-provided separator was produced as in Example 1 except that the following was carried out. That is, a center part of a film (i.e., a central ⅓ part when a width of the film is divided into three parts) was heated by IR heaters for approximately 1 second. In so doing, temperatures of four upstream-side IR heaters of two central lines of IR heaters were set to 300° C. Then, the resultant film was cooled. Then, the resultant film was wound up at a winding tensile force of 130 N/m. This produced the function-provided separator. The results of measurement of curling amounts of the function-provided separator thus produced are shown in Table 1.

In each of Examples 1 through 3, a thermocouple was provided on the film so as to allow a temperature distribution of a film to be measured (at least three pieces at the both ends and the center part of the film).

TABLE 1

|  | Left end mm | Center mm | Right end mm | Average of both ends mm | Average of both ends-center mm | Standard deviation mm |
| --- | --- | --- | --- | --- | --- | --- |
| Comparative Example 1 | 1.8 | 4.0 | 2.2 | 2.0 | −2.0 | 1.17 |
| Example 1 | 1.5 | 0.5 | 1.5 | 1.5 | 1.0 | 0.58 |
| Example 2 | 1.0 | 0.5 | 0.6 | 0.8 | 0.3 | 0.26 |
| Example 3 | 1.3 | 0.8 | 1.7 | 1.5 | 0.7 | 0.45 |

Effect of Present Embodiment

A film producing method in accordance with the present embodiment is a method of producing a function-provided separator 12a (film) including a separator 12 (base material layer) having a characteristic of being shrunk by heat and a heat-resistant layer 4 (functional layer) which is dried while being restricted by the separator 12, the method including: a heating step including heating, as illustrated in (a) of FIG. 5, the function-provided separator 12a while applying, in a direction in which a length of the function-provided separator 12a extends, a tensile force to the film so as to convey the function-provided separator 12a; and a heat treatment step including subjecting, as illustrated in FIG. 7, the function-provided separator 12a to a heat treatment while, in a distribution along a width of the function-provided separator 12a, a center part C is higher in temperature than end parts E.

Since the heat-resistant layer 4 is dried while being restricted by the separator 12, the heat-resistant layer 4 retains stress by which the heat-resistant layer 4 has a tendency to shrink. Then, in a case where the function-provided separator 12a including the heat-resistant layer 4 and the separator 12 is heated while being subjected to a longitudinal tensile force so as to be conveyed, the function-provided separator 12a is curled so that the heat-resistant layer 4 is located at an inner side of the curl. In this case, a curling amount of the center part C of the function-provided separator 12a is larger than that of an end part E of the function-provided separator 12a. This causes a difference in curling amount between (i) a slit film obtained from the center part of the function-provided separator 12a by slitting and (ii) a slit film obtained from the end part of the function-provided separator 12a by slitting.

According to the film producing method in accordance with the present embodiment, the heat treatment step is carried out so as to heat the center part C of the function-provided separator 12a more than the end part E of the function-provided separator 12a. This causes a shrinkage amount at a center part of the separator 12 to be similar to a shrinkage amount at an end part of the separator 12.

This not only reduces an absolute value of curling amount of the function-provided separator 12a but also causes curling amounts to be constant among a plurality of slit separators to be obtained by slitting the function-provided separator 12a. This provides stability to the quality of the slit separators.

Note that the number of drying chambers to be included in the drying device 5 is not limited to 1. Alternatively, it is possible to increase the number according to drying capability required of the drying device 5.

The number of rollers, which are to be included in the drying chamber 6 and in which a heating medium/media is/are to be circulated, is not limited to 7. The number of rollers, which are to be included in the drying chamber 6 and in which a heating medium/media is/are not to be circulated, is not limited to 2. Alternatively, it is possible to increase or decrease these numbers according to drying capability required of the drying device 5.

The number of roller(s) 8 to be provided outside the drying device 5 and the number of IR heater(s) 81 to be provided outside the drying device 5 are each not limited to 1. Alternatively, it is possible to increase these numbers according to curling removal capability required in the drying step in accordance with the present embodiment.

(Heating Device in Heat Treatment Step)

The heating device to be used in the heat treatment step is not limited to the IR heater 81 which locally heats the function-provided separator 12a. As illustrated in (c) of FIG. 5, the heating device can be an IR heater 81a which heats a function-provided separator 12a along a width of the function-provided separator 12a while a temperature of a center part c of the IR heater 81a is higher than those of end parts e of the IR heater 81a. A temperature of the center part C of the function-provided separator 12a is higher than a temperature of each of the end parts E of the function-provided separator 12a.

The heating device is not limited to a device which heats a function-provided separator 12a by irradiation with infrared rays. The heating device can be a device which heats the function-provided separator 12a by blowing warm air onto the function-provided separator 12a.

(Surface of Function-Provided Separator 12a to be Heated in Heat Treatment Step)

In the heat treatment step, it is preferable that the function-provided separator 12a is heated from a separator 12-side. The curling of the function-provided separator 12a is affected by the separator 12 of the function-provided separator 12a more than by the heat-resistant layer 4 of the function-provided separator 12a. Therefore, the curling of the function-provided separator 12a can be effectively restricted by heating the function-provided separator 12a from the separator 12-side. In a case where the function-provided separator 12a has a thickness of not less than 20 μm, it is particularly preferable to heat the surface at which the separator 12 is located.

(Configuration in which Heating Device in Heat Treatment Step is Provided in Drying Device 5)

Figure 8:
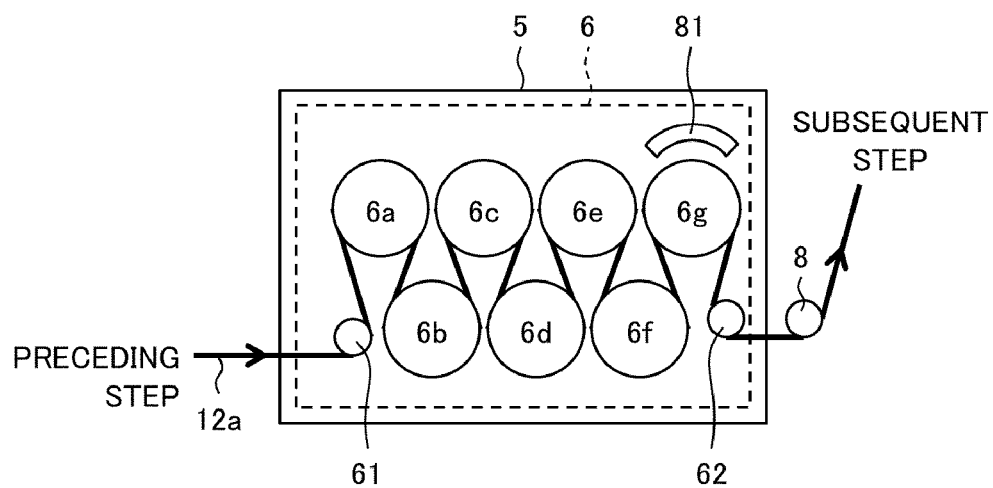
FIG. 8 is a view schematically illustrating a configuration in which the IR heater used in the heat treatment step included in the drying step illustrated in FIG. 5 is provided in a drying device.

FIG. 8 is a view schematically illustrating a configuration in which the IR heater 81 illustrated in (b) of FIG. 5 is provided in the drying device 5 illustrated in (a) of FIG. 5. As illustrated in FIG. 8, the IR heater 81 is provided so as to face a roller 6g in the drying chamber 6 of the drying device 5.

The IR heater 81 can be thus provided so as to heat a part of the function-provided separator 12a, which part is in contact with the roller 6g. In other words, the roller 8 illustrated in (b) of FIG. 5 can be replaced with the roller 6g.

Note that a roller to face the IR heater 81 is not limited to the roller 6g. The IR heater 81 need only be provided so as to face at least one of one or more rollers which is/are included in the drying chamber 6 of the drying device 5 and in which a heating medium/media is/are circulated.

Alternatively, it is possible that the IR heater 81a illustrated in (c) of FIG. 5 instead of the IR heater 81 is provided so as to cover a part of the function-provided separator 12a, which part is in contact with the roller 6g.

(Environment Outside Drying Device 5)

A temperature outside the drying device 5 is maintained at a constant temperature of not less than 20° C. and not more than 30° C. An absolute humidity is maintained at a constant humidity of not less than 30% and not more than 60%. A function-provided separator 12a is conveyed in such an environment with a constant temperature and a constant humidity. Therefore, while the function-provided separator 12a is conveyed during a period from the preceding step until the start of the drying step, the function-provided separator 12a has a constant temperature and a constant humidity with which the drying can be suitably started. In addition, while the function-provided separator 12a is conveyed during a period from the drying step until the start of a following step, the function-provided separator 12a has a constant temperature and a constant humidity with which the subsequent step can be suitably started.

As has been described, the film producing method in accordance with an embodiment of the present invention can further include a step of conveying the function-provided separator 12a so that the function-provided separator 12a passes through air which is controlled to have at least one of a constant temperature and a constant humidity.

For example, assume a case where air present in the path on which the function-provided separator 12a from the preceding step is conveyed to the drying device 5 in the examples shown in (a) of FIG. 5 is controlled to be at a constant temperature. In such a case, in the drying device 5, it is possible to process the function-provided separator 12a which has been controlled to have the constant temperature in advance. Therefore, in a case where the function-provided separator 12a is to be heated to a target temperature in the drying device 5, it is possible to accurately set a quantity of heat to be applied to the function-provided separator 12a.

For example, assume a case where air present in the path on which the function-provided separator 12a is conveyed from the roller 8 to a subsequent step is controlled to be at a constant temperature. In such a case, the function-provided separator 12a, which has been heated by the IR heater 81 to a target temperature, can be conveyed until the function-provided separator 12a has the constant temperature. Therefore, in a case where there is a subsequent step (such as an inspection step) which would be adversely affected by a change in temperature of the function-provided separator 12a after the heating by the roller 8, it is still possible to provide a function-provided separator 12a which is suitable for the subsequent step.

In addition, assume a case where air present in the path on which the function-provided separator 12a is conveyed from the drying device 5 to a subsequent step is controlled to be at a constant temperature. In such a case, it is easy to predict a heat balance between (i) a quantity of heat applied by the IR heater 81 to the function-provided separator 12a and (ii) a quantity of heat that is transferred from the function-provided separator 12a into the air.

Specifically, while the IR heater 81 applies heat to the function-provided separator 12a, heat is also transferred from the function-provided separator 12a into air. Then, in a case where the temperature of air which comes into contact with the function-provided separator 12a is controlled to be constant, it is possible to accurately predict quantities of heat that enters and exits the function-provided separator 12a. By use of the results of this prediction, it is possible to adjust, for example, an output of the IR heater 81.

(Film Producing Device)

The scope of the present invention also encompasses a film producing device which produces a function-provided separator 12a having a characteristic of being shrunk by heat, the film producing device including: rollers 6a through 6g (heating device) which heats the function-provided separator 12a while applying, in a direction in which a length of the function-provided separator 12a extends, a tensile force to the function-provided separator 12a so as to convey the function-provided separator 12a; and an IR heater 81 (heat treatment device) which subjects the function-provided separator 12a to a heat treatment while, in a distribution along a width of the function-provided separator 12a, a center part is higher in temperature than end parts.

Alternatively, this film producing device can include an IR heater 81a (heat treatment device) instead of the IR heater 81.

(Film)

The scope of the present invention also encompasses a film including: a base material layer which has a characteristic of being shrunk by heat; and a functional layer which is dried while being restricted by the base material layer, a center part sample from at least one part of a center part of the film being smaller in curling amount with respect to a width of the film than an end part sample from at least one part of an end part of the film. That is, the scope of the present invention also encompasses films having curling amounts illustrated in Examples 1 through 3 of Table 1.

The scope of the present invention also encompasses a film including: a base material layer which has a characteristic of being shrunk by heat; and a functional layer which is dried while being restricted by the base material layer, a standard deviation in curling amount with respect to a width of the film being not more than 1 mm between (i) two samples from respective end parts located 15 cm away from corresponding ends of the film toward a center part of the film and (ii) a sample from the center part of the film. That is, the scope of the present invention also encompasses films having curling amounts illustrated in Examples 1 through 3 of Table 1.

By employing the film in which variances in width-wise curling amounts are reduced, it is no longer necessary to re-set, at each rolling of the film for production of a battery, conditions for rolling of the film according to width-wise curling amounts of the film. This allows for an increase in productivity in producing a battery. Since folding of the film can be restricted, it is possible to increase a yield in production of a battery from the film.

A yield in production of a battery can be increased with (I) a film including: a base material layer which has a characteristic of being shrunk by heat; and a functional layer which is dried while being restricted by the base material layer, a center part sample from a part of the film being smaller in curling amount with respect to a width of the film than an end part sample from an end part of the film and (II) a film obtained by configuring the above film such that a standard deviation in the width-wise curling amounts of samples is not more than 1 mm.

(IR Heater)

Figure 11:
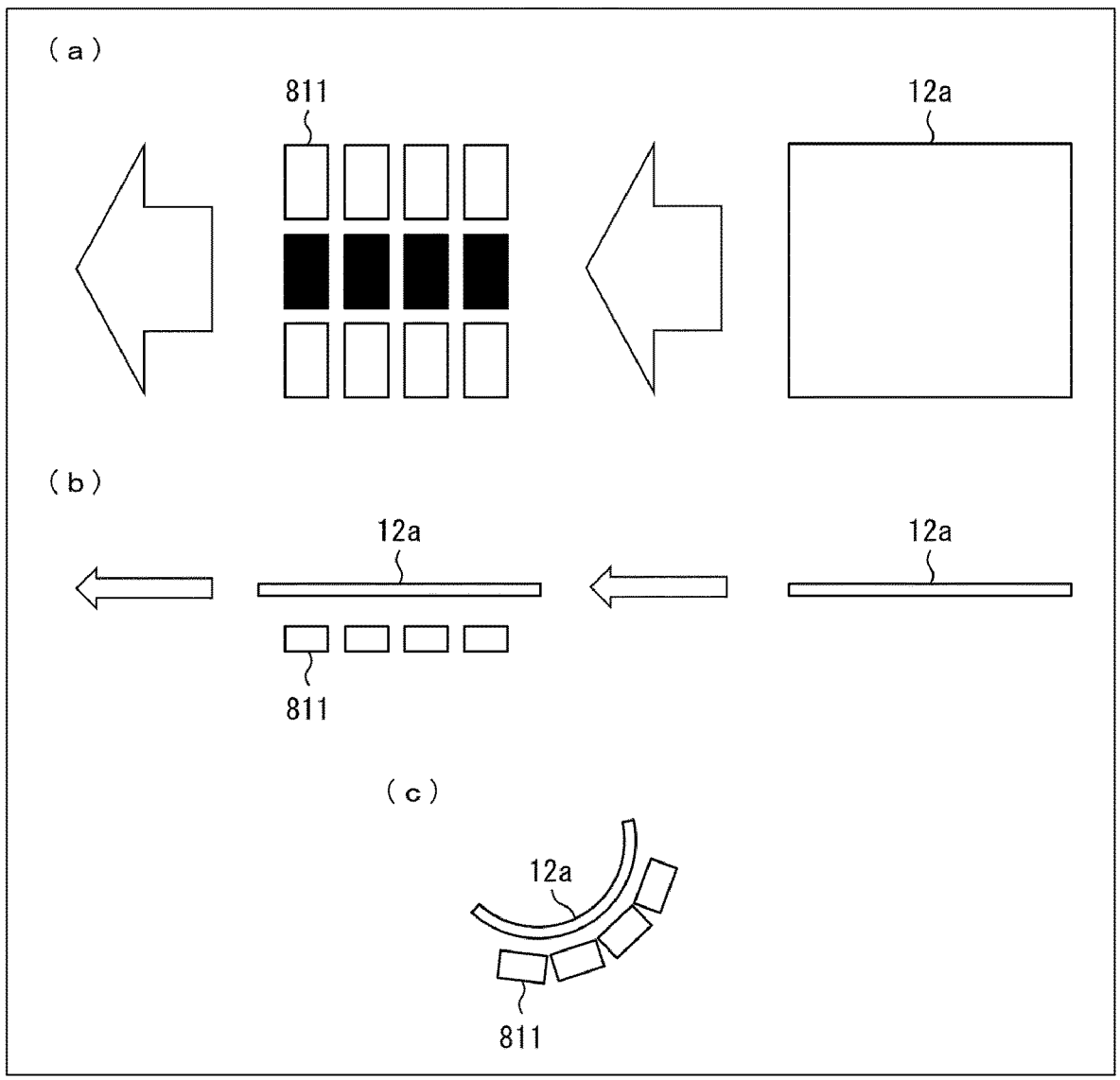
FIG. 11 is a view schematically illustrating a configuration of an IR heater which heats a function-provided separator so as to achieve the distribution of applied heat quantities illustrated in FIG. 7.

In a case where a function-provided separator 12a is produced during production of a battery, it is an object to prevent the function-provided separator 12a from being folded while the function-provided separator 12a is being wound. FIG. 11 is a view schematically illustrating a configuration of an IR heater 81 which heats a function-provided separator 12a so as to achieve the distribution of applied heat quantities illustrated in FIG. 7. As illustrated in FIG. 11, the IR heater 81 includes a plurality of heating modules which are provided along a path in which the function-provided separator 12a is to be conveyed. This allows the function-provided separator 12a to be heated so as to achieve the distribution of applied heat quantities illustrated in FIG. 7.

(a) of FIG. 11 is a plan view illustrating a configuration of the IR heater 81. (b) of FIG. 11 is a side view corresponding to the (a) of FIG. 11. The IR heater 81 includes a plurality of heating modules 811. As illustrated in (a) and (b) of FIG. 11, the total of 12 heating modules 811, for example, are included in the IR heater 81, and, on a flat surface extending parallel to the function-provided separator 12a, are arranged in (i) 3 lines perpendicular to a direction in which the function-provided separator 12a is conveyed and (ii) 4 columns extending in the direction in which the function-provided separator 12a is conveyed.

As illustrated in (a) of FIG. 11, the IR heater 81 can control heating modules 811, which are arranged in a second line, for example, to have outputs higher than those of heating modules 811 which are arranged in the other lines. That is, the IR heater 81 can selectively use the plurality of heating modules 811. The IR heater 81 thus configured serves as a sheet heating element, so as to have an excellent radiation distribution. This makes it possible to uniformly and stably heat a large area of the function-provided separator 12a.

The heating modules 811 each include, for example, an infrared lamp which radiates infrared rays having wavelengths in a range of 3 μm to 7 μm. This range of wavelengths of the infrared rays includes an absorption wavelength of a main component of a separator 12 which serves as a base material layer of the function-provided separator 12a. This allows the IR heater 81 to selectively heat a base material layer.

(c) of FIG. 11 is a side view illustrating another configuration of the IR heater 81 different from the configuration illustrated in (b) of FIG. 11. In a case where the function-provided separator 12a is conveyed on rollers, for example, a path on which the function-provided separator 12a is to be conveyed is a curved surface. In this case, the IR heater 81 can include a plurality of heating modules 811 which are arranged along the path which is a curved surface and on which the function-provided separator 12a is to be conveyed. The IR heater 81 thus configured serves as a curved surface heating element. This allows the IR heater 81 to be provided along the path which is a curved surface. Therefore, (i) the freedom in process planning increases, (ii) a radiation distribution is excellent, and (iii) it is possible to uniformly and stably heat a large area of the function-provided separator 12a.

Note that the IR heater 81a can also include, as illustrated in FIG. 11, a plurality of heating modules which are arranged along a path on which a function-provided separator 12a is to be conveyed. This allows the IR heater 81a to heat the function-provided separator 12a so as to achieve the distribution of applied heat quantities illustrated in FIG. 7.

Recapitulation

A film producing method in accordance with an embodiment of the present invention is a method of producing a film including a base material layer having a characteristic of being shrunk by heat and a functional layer which is dried while being restricted by the base material layer, the method including: a heating step including heating the film while applying, in a direction in which a length of the film extends, a tensile force to the film so as to convey the film; and a heat treatment step including subjecting the film to a heat treatment while, in a distribution along a width of the film, a center part is higher in temperature than end parts.

Since the functional layer is dried while being restricted by the base material layer, the functional layer retains stress by which the functional layer has a tendency to shrink. Then, in a case where the film including the functional layer and the base material layer is heated while being subjected to a longitudinal tensile force so as to be conveyed, the film is curled so that the functional layer is located at an inner side of the curl. In this case, a curling amount of a center part of the film is larger than that of an end part of the film. This causes a difference in curling amount between (i) a slit film obtained from the center part of the film by slitting and (ii) a slit film obtained from the end part of the film by slitting.

According to the production method, the heat treatment step is carried out so as to heat the center part of the film more than the end part of the film. This causes a shrinkage amount at a center part of the base material layer to be similar to a shrinkage amount at an end part of the base material layer.

This not only reduces an absolute value of curling amount of the film but also causes curling amounts to be constant among a plurality of slit separators to be obtained by slitting the film. This provides stability to the quality of the slit separators.

Note that the heating step and the heat treatment step can be carried out in this order or vice versa. Alternatively, the heating step and the heat treatment step can be carried out simultaneously. In a case where the heating step and the heat treatment step are carried out simultaneously, the heat treatment step can be carried out throughout the heating step, or can be carried out during part of the heating step.

The film producing method in accordance with an embodiment of the present invention is preferably configured such that in the heat treatment step, the film is heated so that, in a distribution along the width of the film, heat applied to the center part is larger in quantity than heat applied to the end parts.

The film producing method in accordance with an embodiment of the present invention is preferably configured such that: in the heating step, the film is heated by bringing the film into contact with one or more heated rollers; and in the heat treatment step, a part of the film is subjected to the heat treatment, which part comes into contact with at least one of the one or more heated rollers.

With the production method, the heating step and the heat treatment step can be carried out in the vicinity of the same roller. This allows the heating step and the heat treatment step to be carried out, for example, at the same location in a drying chamber.

The film producing method in accordance with an embodiment of the present invention is preferably configured such that the film is a battery separator.

The film producing method in accordance with an embodiment of the present invention is preferably configured such that in the heat treatment step, the film is heated from a side which the base material layer faces.

According to a film including a base material layer which has a characteristic of being shrunk by heat and a functional layer which is dried while being restricted by the base material layer, shrinkage of the film is affected by the base material layer more than by the functional layer. With the production method, it is possible to effectively restrict curing of the film by heating the film from the base material layer-side.

The film producing method in accordance with an embodiment of the present invention is preferably configured so as to further include: a step including conveying, before at least one of the heating step and the heat treatment step, the film so as to cause the film to pass through air whose temperature is controlled to be constant.

With the production method, in at least one of the heating step and the heat treatment step, it is possible to process the film which is controlled to have a constant temperature in advance. Therefore, in a case where the film is to be heated to a target temperature in the at least one of the heating step and the heat treatment step, it is possible to accurately set a quantity of heat to be applied to the film.

The film producing method in accordance with an embodiment of the present invention is preferably configured so as to further include: a step including conveying, after at least one of the heating step and the heat treatment step, the film so as to cause the film to pass through air whose temperature is controlled to be constant.

With the production method, the film, which was heated to a target temperature in at least one of the heating step and the heat treatment step, can be conveyed until the film has a constant temperature after the at least one of the heating step and the heat treatment step. Therefore, in a case where there is a subsequent step (such as an inspection step) which would be adversely affected by a change in temperature of the film after the at least one of the heating step and the heat treatment step, it is still possible to provide a film which is suitable for the subsequent step.

The film producing method in accordance with an embodiment of the present invention is preferably configured such that in the heat treatment step, the film is subjected to the heat treatment while the film is being conveyed so as to pass through air whose temperature is controlled to be constant.

With the production method, it is easy to predict, in the heat treatment step, a heat balance between (i) a quantity of heat applied to the film and (ii) a quantity of heat that is transferred from the film into the air.

A film producing device in accordance with an embodiment of the present invention is a film producing device which produces a film including a base material layer having a characteristic of being shrunk by heat and a functional layer which is dried while being restricted by the base material layer, the film producing device including: a heating device which heats the film while applying, in a direction in which a length of the film extends, a tensile force to the film so as to convey the film; and a heat treatment device which subjects the film to a heat treatment while, in a distribution along a width of the film, a center part is higher in temperature than end parts.

This configuration not only reduces an absolute value of curling amount of the film but also causes curling amounts to be constant among a plurality of slit separators to be obtained by slitting the film. This provides stability to the quality of the slit separators.

A film in accordance with an embodiment of the present invention is a film including: a base material layer which has a characteristic of being shrunk by heat; and a functional layer which is dried while being restricted by the base material layer, a center part sample from at least one part of a center part of the film being smaller in curling amount with respect to a width of the film than an end part sample from at least one part of an end part of the film.

A film in accordance with an embodiment of the present invention is a film including: a base material layer which has a characteristic of being shrunk by heat; and a functional layer which is dried while being restricted by the base material layer, a standard deviation in curling amount with respect to a width of the film being not more than 1 mm between (i) two samples from respective end parts located 15 cm away from corresponding ends of the film toward a center part of the film and (ii) a sample from the center part of the film.

The film in accordance with an embodiment of the present invention is preferably configured such that a curling amount, with respect to the width of the film, of the sample from the center part of the film is not more than 3 mm.

Alternatively, the film can be a simple film which includes (i) a base material layer which has a characteristic of being shrunk by heat and (ii) a functional layer which is disposed on the base material layer.

Additional Remarks

The present invention is not limited to the embodiments, but can be altered by a skilled person in the art within the scope of the claims. The present invention also encompasses, in its technical scope, any embodiment derived by combining technical means disclosed in differing embodiments. Further, it is possible to form a new technical feature by combining the technical means disclosed in the respective embodiments.

REFERENCE SIGNS LIST

1 Lithium ion secondary battery
2 External device
3 Lithium ion
4 Heat-resistant layer (functional layer)
5 Drying device
6 Drying chamber
6a through 6g Roller (heating device)
11 Cathode
12 Separator (base material layer)
12a Function-provided separator (film, battery separator)
13 Anode
81, 81a IR heater (heat treatment device)
C Center part
E End part

The invention claimed is:

1. A method of producing a film including
a base material layer that will shrink when exposed to heat and
a functional layer which is dried while being restricted by the base material layer,
said method comprising:
a heating step comprising heating the film while applying, in a direction in which a length of the film extends, a tensile force to the film so as to convey the film; and
a heat treatment step comprising subjecting the film to a heat treatment, wherein the film is heated by applying a larger quantity of heat to the center part than to the end parts in a distribution along the width of the film, and wherein during the heat treatment, in a distribution along a width of the film, a center part has a higher temperature than end parts.

2. The method as set forth in claim 1, wherein:
in the heating step, the film is heated by bringing the film into contact with one or more heated rollers; and
in the heat treatment step, a part of the film is subjected to the heat treatment, wherein the film part comes into contact with at least one of the one or more heated rollers.

3. The method as set forth in claim 1, wherein
the film is a battery separator.

4. The method as set forth in claim 1, wherein
in the heat treatment step, the film is heated from a side which the base material layer faces.

5. The method as set forth in claim 1, further comprising:
a step comprising conveying, before at least one of the heating step and the heat treatment step, the film so as to cause the film to pass through air whose temperature is controlled to be constant.

6. The method as set forth in claim 1, further comprising:
a step comprising conveying, after at least one of the heating step and the heat treatment step, the film so as to cause the film to pass through air whose temperature is controlled to he constant.

7. The method as set forth in claim 1, wherein
in the heat treatment step, the film is subjected to the heat treatment while the film is being conveyed so as to pass through air whose temperature is controlled to he constant.

* * * * *